Patented Oct. 28, 1930

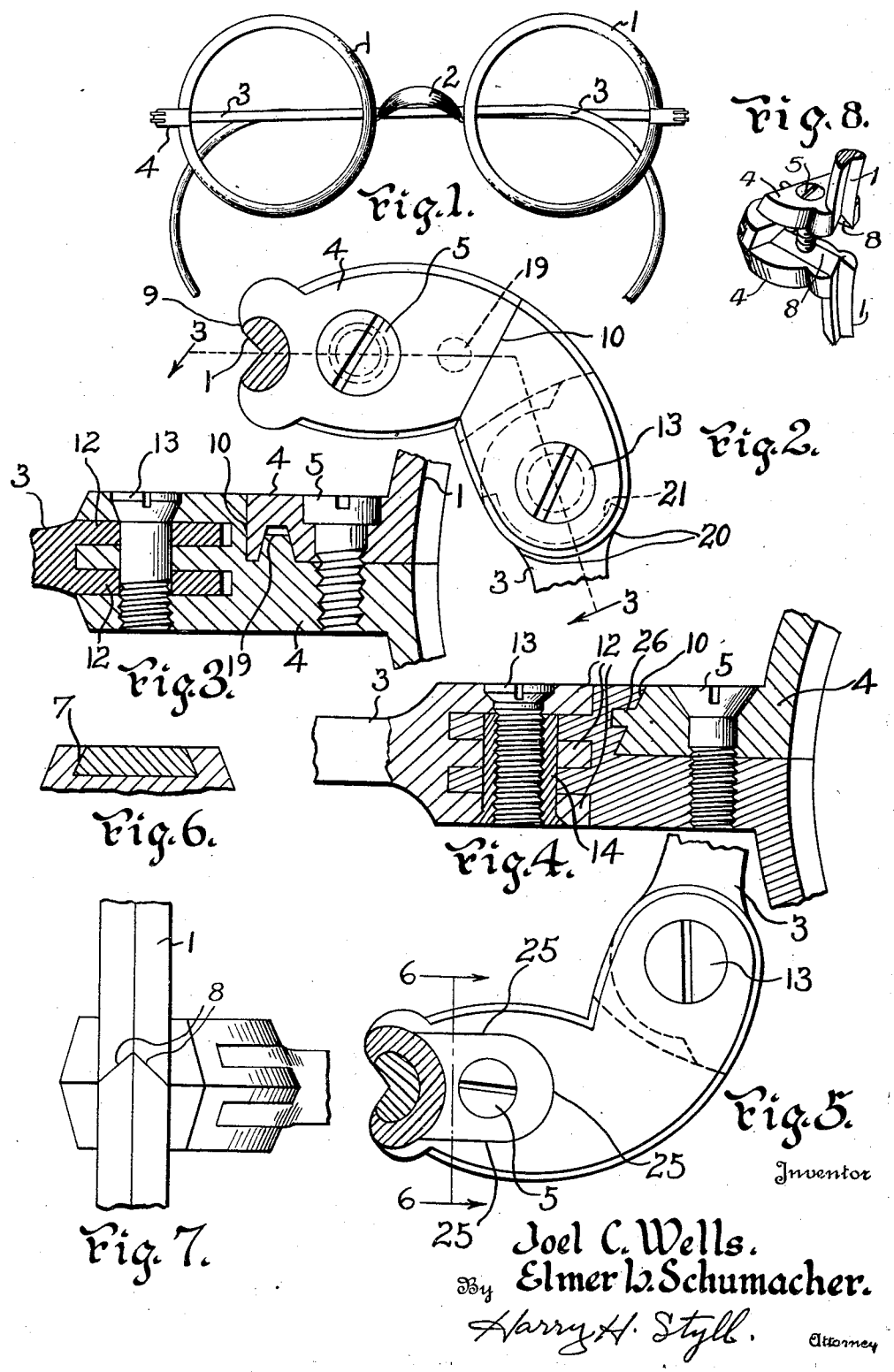

1,779,789

UNITED STATES PATENT OFFICE

JOEL C. WELLS AND ELMER L. SCHUMACHER, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS

OPHTHALMIC MOUNTING

Application filed August 15, 1925. Serial No. 50,456.

This invention relates to ophthalmic mountings and more particularly to the construction of an improved hinge connection of the temples to the lens rims of such a mounting, and of means for securing the ends of the lens rims together.

The principal object of the invention is to provide an improved construction of temple connection, and means for securing the ends of the lens rims together wherein the temple may be removed without disturbing the connection of the ends of the lens rims and vice versa, and wherein the temple and end piece securing means are relieved of the tendency to back out or loosen up in use, and also wherein the temple connection is given increased bearing surface to enable it to work smoother in use and to prevent its working loose and getting out of line.

Another object of the invention is to provide such a construction which will be stronger and more durable and which will work truer in operation than prior art constructions.

Another object of the invention is to provide means to remove bearing friction from the temple securing means, and from the means securing the ends of the lens rims together.

Another object is to provide means for increasing the bearing surface of the temple connections.

Another object is to provide means for keeping the ends of the lens rims from getting out of alignment and working loose when in use.

Another object is to prevent, wobbly, loose fitting, and falling temples and loose fitting ends of the lens rims which hitherto have been liable to get out of alignment.

Another object is to provide an endpiece construction, that is strong, compact, and neat appearing, that will retain its alignment and trueness of working parts during use.

Other objects of the invention will be apparent from the following specifications and drawings accompanying them, the preferred forms being shown and described by way of illustration, it being apparent that many modifications may be made which will come within the scope of the invention as set forth in the accompanying claims all of which are considered within the spirit of the invention and forming a part thereof.

Referring to the drawings in which similar characters are used to denote corresponding parts throughout:

Figure 1 is a front view of a pair of spectacles embodying the invention.

Figure 2 is a top or plan view of the temple connection, and the connection for the ends of the lens rims.

Figure 3 is a cross section on line 3—3 of Figure 2.

Figure 4 is a similar cross section of another modification.

Figure 5 is a plan view showing one means of securing the end of the lens rim.

Figure 6 is a cross section on line 6—6 of Figure 5.

Figure 7 is a side elevation showing the line of jointure of the endpiece sections.

Figure 8 is a perspective view showing the endpieces separated.

It has long been known that the temple connections of spectacles work loose and cause what is known as a "falling temple" that is the temple will not stay in any one position if the spectacle is placed so that gravity will have the opportunity to act on it, to make it move on its pivot that is to say the pivot joint works loose and the temple bearing becomes loose and wobbly. This is also true of the connections of the ends of the lens rims. If the lens rim connections get loose, the frame gets out of line and the lens may fall out. The screws which act as the pivots for the temples, and which hold the ends of the rims together also back out, due to working, particularly the temple screw which is constantly being acted upon by the pivoted temple as it moves about its pivot. This invention has for one of its objects to overcome these defects.

Also it has been found that to replace a new lens in the frame, the temple had to be loosened, and likewise to replace a temple the lens had to be loosened, this invention also overcomes this defect.

The ordinary spectacle comprises a pair of lens rims 1, held together by a bridge 2, and supported on the face by the temples 3. The rims 1 terminate in endpieces 4, which are held together by the screw 5. The end connection between the upper and lower endpieces 4 may be bevelled as at 10 Figure 4. If the bevel is made as in Figures 4 and 6 it acts as a dovetail connection as shown in Figure 6, which locks the end pieces against separation except along the line of the dovetail, and holds the parts in alignment and prevents working or getting loose in use.

It will be noted in Figure 7, that the endpieces are also bevelled on their contacting faces as shown at 8, this also tends to lock the endpieces against getting loose and working.

The rims 1 are secured to the endpieces by soldering or otherwise as shown at 9 in Figure 2. The joints between the endpieces may be made in various ways and located at various places. In Figure 2 it is along the line 10, in Figure 5 it is along the line 25.

The temple 3 is provided with hinge bearing ears 12, all the views showing two such ears, except Figure 4 which shows three ears. The temple ears are pivoted on the temple securing screw 13 which is secured in the endpiece and passes through the ears of the temple.

In Figure 4, three temple ears are shown, the endpiece here is recessed to admit the three ears, this makes a very strong tight and durable bearing. A lug or locating pin 19 is shown in Figures 2 and 3, this gives additional security in holding the endpieces in alignment.

The line of the temple is blended into the line of the endpiece as shown at 20 in Figure 2 to give a neat and finished appearance to the joint, and the end of the endpiece may be recessed, if desired, as shown at 21 in dotted lines and a collar placed on the temple ear to fill the recess and thus hide the joint at the point where the temple enters the endpiece.

To change the temple is it necessary only to remove the screw 13, without disturbing the lens and the endpiece connections to change a lens it is necessary only to remove the screw 5, without disturbing the temple connection.

The operation and functions of the invention are as follows: The lens rim 1 is held in closed position by the screw 5 through the endpieces 4. These endpieces abut one on the other. In some forms one part of the endpiece is recessed into the other as shown in Figure 5. The forms shown in Figures 2, 3 and 4 abutting on a line 10, Figure 2 entirely across the endpiece and the form shown in Figure 5 abutting on a line 25 one end and two sides of one of the endpiece sections fitting into the other. The temple ears are inserted in the recesses of the endpiece designed for them, the holes in the ears being aligned with the screw hole for the screw 13 in the endpiece. To remove the temple the screw 13 is removed, and the temple ears pulled out of the endpiece recesses. In Figure 5 the upper endpiece section is dovetailed into the lower endpiece section, hence the upper section has to be slid into the lower section laterally along the dovetail line. The dovetailing 7, and the inset recess 25 Figure 5 prevents working of the endpiece sections about the screw 5, as does the bevelling 8 in Figure 7. The locating lug 19, Figures 2 and 3 also prevents its working about the screw 5 in the forms where one endpiece section is not recessed into the other. The flange 21, Figure 2, on the temple hides the endpiece ends and makes a neat, clean looking finish at the hinge joint, as does the tapering of the temple into the hinge joint as shown at 20, Figure 2.

From the foregoing description of construction and operation it will be seen that a temple connection with increased bearing surface has been provided, that the temple may be removed without disturbing the lens rims, that a secure endpiece connection has been provided free from tendency to work and get loose around the retaining screw, that means to prevent lateral play of the end piece sections has been provided, and that a strong, sturdy, neatly finished end piece and temple connection has been provided.

In Figure 4 a lug 26 is shown at the joint 10, projecting from the upper end piece 4 into the lower end piece 4. This is used as a fulcrum point for opening the frame to insert or take out a lens. To do this the screw 5 is removed and the upper end piece worked on the lower end piece with the lug 26 as a fulcrum, which permits the two end pieces being parted sufficiently to insert or take out the lens, but not enough to allow the two end pieces from being entirely separated.

Having described our invention, we claim:

1. In an ophthalmic mounting, a lens rim having on one end a short offset endpiece section and on the other a longer offset portion having a recess to receive the shorter section, the abutting surfaces forming a V-shaped joint, a screw securing the short section to the long section, said long section having a hinge connection, a temple having a hinge connection engaging the hinge connection on the endpiece, pivotal means connecting the two hinge connections, and a locating lug on one section projecting into the other.

2. In an ophthalmic mounting, a lens rim having on one end a short offset endpiece section and on the other end a longer offset portion having a recess to receive the shorter section, the ends of said sections being inclined to their abutting surfaces, a screw securing the short section to the long section, said long section having a hinge connection, a temple having a hinge connection engaging the hinge connection on the endpiece, pivotal means connecting the two hinge connections, and a locating lug on one section projecting into the other.

3. In an ophthalmic mounting, a lens rim having offset endpiece sections abutting one over the other, one of said endpiece sections having an inclined edge fitting into an inclined abutting edge on the other endpiece section and locked against longitudinal movement by said inclination and said sections having aligned openings, interlocking members on the abutting face surfaces, a retaining screw through the openings, one of said offset endpieces having a plurality of hinge ear recesses and a temple having a plurality of hinge ears fitting into the hinge ear recesses respectively, and a pivot through the hinge ears.

4. In an ophthalmic mounting, a lens rim having offset endpiece sections abutting one over the other, one of said endpiece sections having an inclined edge fitting into an inclined abutting edge on the other endpiece section and locked against longitudinal movement by said inclination and said sections having aligned openings, interlocking members on the abutting surfaces, a retaining member through the openings, one of said offset endpieces having a plurality of hinge ear recesses, a temple having a plurality of hinge ears fitting into the hinge ear recesses respectively, and a pivot through the hinge ears.

5. In an ophthalmic mounting, a lens rim having on one end a short offset endpiece section and on the other end a longer offset endpiece section having a recess to receive the shorter section, one of said endpiece sections having an inclined edge fitting into an inclined abutting edge on the other endpiece section and locked against longitudinal movement by said inclination, a screw securing the short section to the long section, said long section having a plurality of hinge recesses, a temple having a plurality of hinge ears one in each hinge recess of the endpiece section, a pivot pin through the ears of the temple and the endpiece section to hold them together and act as a pivot for the hinge ears, and a locating lug on one section and projecting into the other.

JOEL C. WELLS.
ELMER L. SCHUMACHER.